United States Patent

Tomforde et al.

[11] Patent Number: 6,000,748
[45] Date of Patent: Dec. 14, 1999

[54] MOTOR VEHICLE HAVING A BODY SUPPORT STRUCTURE AND ASSEMBLY TEMPLATE

[75] Inventors: Johann Tomforde, Sindelfingen; Alexander Pothoven, Flacht/Weissach; Ralf Freischläger, Leonberg, all of Germany

[73] Assignee: MC Micro Compact Car Aktiengesellschaft, Switzerland

[21] Appl. No.: 08/790,943

[22] Filed: Jan. 29, 1997

[30] Foreign Application Priority Data

| Jan. 29, 1996 | [DE] | Germany | 196 03 102 |
| Dec. 27, 1996 | [DE] | Germany | 196 54 446 |

[51] Int. Cl.⁶ .................................................. B62D 25/04
[52] U.S. Cl. ............................................. 296/202; 296/29
[58] Field of Search ............................. 296/202, 146.11, 296/76, 29, 30

[56] References Cited

U.S. PATENT DOCUMENTS

| 4,589,199 | 5/1986 | Ohtaki et al. | 29/714 |
| 5,074,609 | 12/1991 | Dear | 296/76 |
| 5,203,073 | 4/1993 | Kotake et al. | 29/784 |

FOREIGN PATENT DOCUMENTS

| 4115755 | 11/1992 | Germany . |
| 4321752 | 6/1994 | Germany . |
| 61-10271 | 1/1986 | Japan . |
| 3-227782 | 10/1991 | Japan . |
| 5-105132 | 4/1993 | Japan . |

*Primary Examiner*—Andrew C. Pike
*Attorney, Agent, or Firm*—Evenson, McKeown, Edwards & Lenahan, P.L.L.C.

[57] ABSTRACT

In a region between at least two mutually adjacent body parts, an assembly template is connected to the body support structure, which template has at least one adjustment edge against which the adjacent body parts can be aligned. The template is centered on centering pins of vehicle door hinges and the adjustment edge serves to position a fender part with respect to the door.

27 Claims, 8 Drawing Sheets

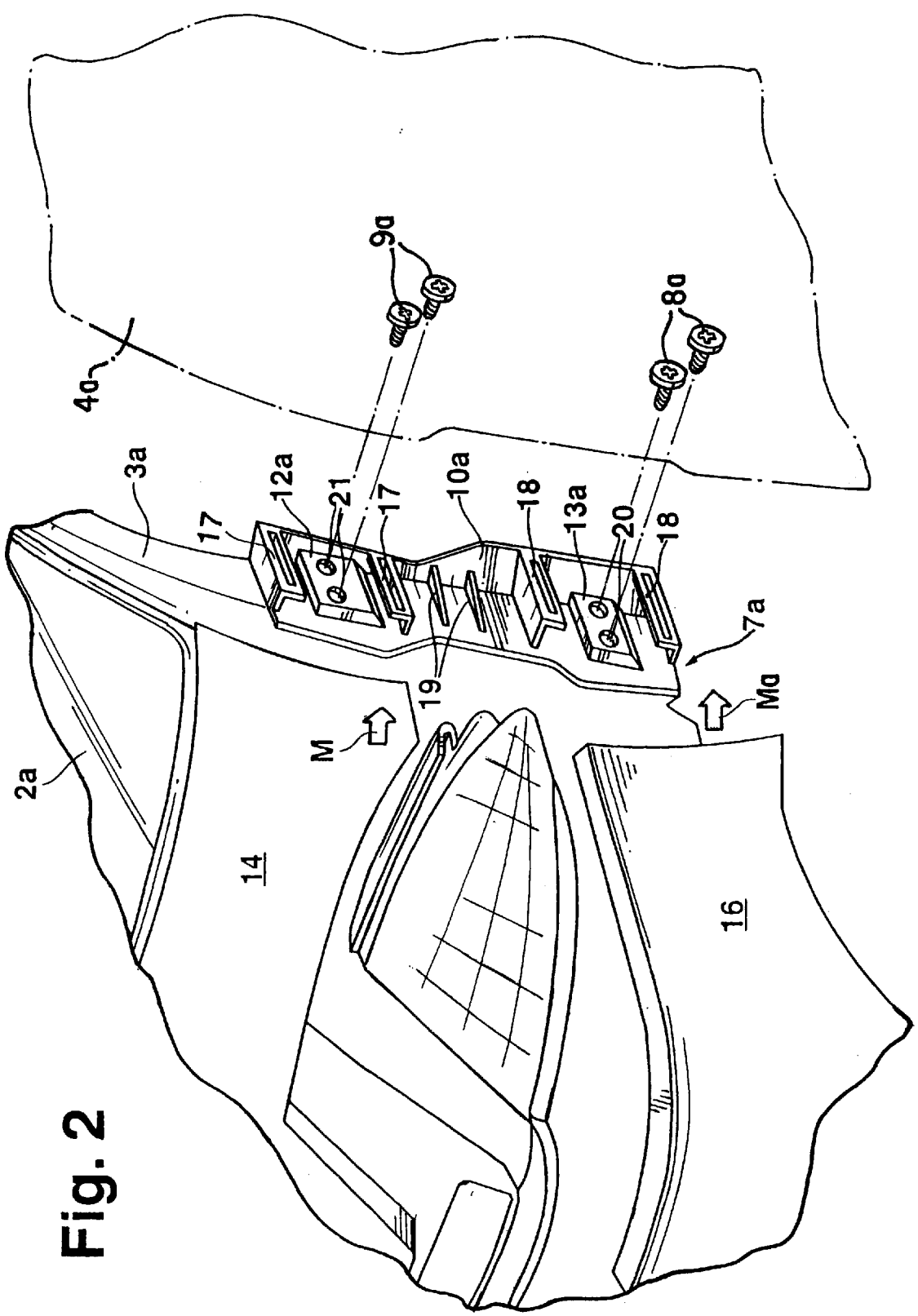

MOTOR VEHICLE HAVING A BODY SUPPORT STRUCTURE AND ASSEMBLY TEMPLATE

BACKGROUND AND SUMMARY OF THE INVENTION

The invention relates to a motor vehicle having a body support structure and a plurality of body parts which can be fixed to the body support structure, and to an assembly template for the motor vehicle.

This application is based on German Patent Application No. 196 03 102.8 filed in Germany on Jan. 29, 1996 and German Patent Application No. 196 54 446.7 filed in Germany on Dec. 27, 1996.

It is known from German Patent Document DE 43 21 752 C1 to fasten a body part in the form of a vehicle door by means of a hinge arrangement on a B-pillar of a body support structure of a motor vehicle. Body parts adjoining such a vehicle door, such as front or rear fenders, may under certain circumstances be fastened to the body support structure such that the various body parts are not aligned exactly with respect to one another and, because of different gap tolerances between mutually adjacent body parts, a nonuniform overall appearance of the body shell is formed.

German Patent Document DE 41 15 755 A1 discloses a motor vehicle, the bumper of which can be fixed on the vehicle body by means of an adjustable mount, in order to avoid damaging the body when mounting the bumper. To this end, the mount has a guide part which is displaceable in the longitudinal direction of the vehicle and interacts with a slide part arranged on the bumper. After mounting the bumper, the guide part can be moved in the displacement direction running in the longitudinal direction of the vehicle, as a result of which the bumper can be slid directly onto the adjacent edge of the body.

An object of the invention is to provide a motor vehicle of the type mentioned at the outset which is provided with an evenly and uniformly arranged body panel.

This object is achieved in that, in a region between at least two mutually adjacent body parts, an assembly template is connected to the body support structure, the assembly template having at least one adjustment edge, against which at least one adjacent body part can be aligned. The solution according to the invention makes it possible to align mutually adjacent body parts uniformly and thus also to adapt the mounting positions of bumpers and headlamps accordingly. This therefore always results in an identical gap dimension and thus also identically running joints and beads between the individual, mutually adjacent body parts. Moreover, it is possible to achieve a gap dimension of the same dimension between all the mutually adjacent body parts. Readjustments of movable body parts, such as vehicle doors, rear lids, or tailgates, are unnecessary, since the movable body parts are already adjusted appropriately during assembly on the body support structure.

In a refinement of the invention, the assembly template has positioning receptacles, by means of which the assembly template can be placed on corresponding centering elements on hinges, fixed on the support-structure side, of a pivotably movable body part of the motor vehicle and can be centered relative to the hinges. As a result, the hinges form a template for the assembly template, so that exact alignment of the assembly template relative to the body support structure becomes possible. In particular, side doors are envisaged as the pivotably movable body parts. However, tailgates, bonnets, and other pivoting parts may also serve as corresponding body parts.

In a further refinement of the invention, at least one centering pin protruding outwards at right angles is provided on each hinge as the centering element, and correspondingly open sockets are provided in the assembly template. As a result, when putting on the assembly template an exact alignment relative to the hinges is already achieved. The alignment by means of the centering pins and the sockets in particular ensures precise positioning in the longitudinal direction of the vehicle.

In a further refinement of the invention, a support edge for a support of the assembly template is provided on a hinge in the vertical direction of the vehicle, against which support edge a support stop of the assembly template is supported. The support edge and the support stop provide alignment and support in the vertical direction of the vehicle relative to the body support structure.

In a further refinement of the invention, the assembly template can be fixed on the body support structure by means of a plurality of fastening points distributed over the length of the said template. Corresponding fastening elements thus fix the assembly template in the respectively aligned end position, the fixing simultaneously ensuring that the assembly template is secured relative to the body support structure in the transverse direction of the vehicle.

In a further refinement of the invention, the assembly template has at least one latching location for joining an adjacent body part by means of a latching connection. As a result, it is possible to fix an adjacent body part at least partially without additional fastening elements.

In a further refinement of the invention, the assembly template can be fastened at fastening points of door hinges of a side door of the motor vehicle. As a result, already existing fastening points are provided in a simple manner for fastening the assembly template.

In a further refinement of the invention, the assembly template can be fastened at the fastening points with the aid of the fastening elements for the door hinges on the body support structure. As a result, no additional fastening elements are required to fasten the assembly template, since the assembly template is fastened to the body support structure in a simple manner together with the door hinges.

In a further refinement of the invention, the assembly template is provided with fixing elements for fastening at least one adjacent body part. As a result, the assembly template has a double function, in that it serves, on the one hand, for alignment and, on the other hand, for fastening adjacent body parts or components.

In a further refinement of the invention, the fixing elements have guides for sliding on the at least one adjacent body part. By means of these guides, a defined assembly direction, which permits exact assembly relative to the assembly template, is already predetermined for the adjacent body part.

In a further refinement of the invention, latching locations for securing the at least one body part in a positively-locking manner in the slid-on end position are assigned to the fixing elements. As a result, the at least one body part to be slid on is already fixed sufficiently on the body support structure without using additional fastening means. Preferably, the body part is supported in its slid-on end position against the adjustment edge of the assembly template.

In a further refinement of the invention, the assembly template is produced as a single component made of plastic. As a result, the assembly template can be produced in a simple and cost-effective manner and in large quantities.

Other objects, advantages, and novel features of the present invention will become apparent from the following detailed description of the invention when considered in conjunction with the accompanying drawings.

BRIEF DESCRIPTION OF THE DRAWINGS

FIG. 2 shows a perspective excerpt, in a representation enlarged with respect to FIG. 1, of a further front region of an embodiment of a motor vehicle according to the invention which is provided with another assembly template similar to FIG. 1;

DETAILED DESCRIPTION OF THE DRAWINGS

Figure 1:
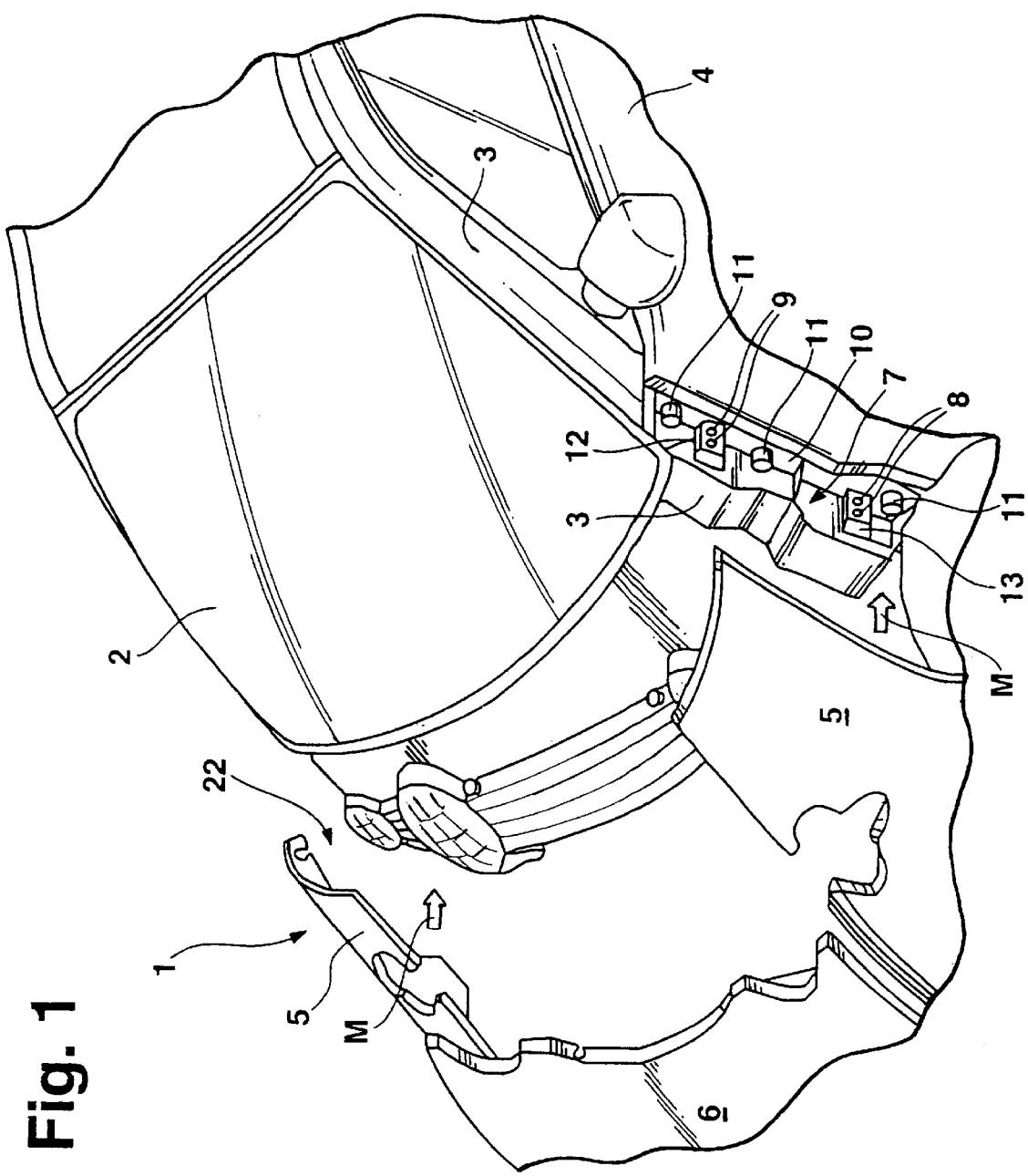
FIG. 1 is a schematic perspective illustration of a front region of an embodiment of a motor vehicle according to the invention which in the region of an A-pillar is provided with an assembly template which is placed on door hinges of a side door and against which front fenders can be aligned and fastened.

A motor vehicle 1 according to FIG. 1 represents a compact motor car which has a windscreen or windshield 2 which is flanked by two A-pillars 3 of a body support structure. A side door 4 is attached respectively to both A-pillars 3 with the aid of two door hinges, the support structure-side hinge parts of the door hinges being fastened to the A-pillar 3 with the aid of fastening screws 8, 9. The door hinges themselves are not visible, since an assembly template 7, described in more detail below, is placed on the A-pillar 3 in the region of the door hinges.

The assembly template 7 represents a one-piece plastic component and is designed in the form of an angular profile. The assembly template 7 is aligned vertically along the A-pillar 3 and extends from a lower end of the A-pillar 3 to approximately the height of the windscreen 2. A rear end, viewed in the direction of travel, of the angular profile of the assembly template 7 is designed in the form of an adjustment edge 10 which protrudes perpendicularly outwards over the entire length of the assembly template 7. This adjustment edge 10 is stabilized by means of support ribs, not illustrated in more detail, of the assembly template 7. At the level of the two door hinges, the assembly template 7 is provided with box-like formations 12 and 13, by means of which the assembly template 7 is adapted to the outer contour, protruding from the outer surface of the A-pillar 3, of the door hinges. The bulged areas 12 and 13 additionally represent guide blocks for body parts, in the form of the front fenders 5, to be attached to the assembly template 7, which guide blocks ensure exact alignment of the fenders 5 on the assembly template 7. Provided on the adjustment edge 10 are three fixing pegs 11 arranged distributed spaced apart over its length, onto which pegs corresponding fixing elements on the front fenders 5 can be latched. These fixing locations 22 are provided at the rear edges of the front fenders 5 and are designed correspondingly to the fixing pegs 11, such that the fenders 5 engage on the fixing pegs 11 by being pressed on from the outside.

To assemble the side doors 4 and the adjacent fenders 5 on the body support structure, first of all the support structure-side hinge parts of the door hinges of the side door 4 are screwed to the A-pillar 3 with the aid of the fastening screws 8 and 9, simultaneously putting on the assembly template 7. Then, each side door is aligned by adjusting the door-side hinge parts of the door hinges with respect to the adjustment edge 10 of the assembly template 7, such that the front edge, not illustrated in more detail, of the side door 4 is aligned exactly parallel to the adjustment edge 10. Then, the front fenders 5 are placed on the fixing pegs 11 of the assembly template 7, the position of the fixing pegs 11 and the arrangement of the associated fixing locations 22 on the front fenders 5 already ensuring that the front fenders 5 are aligned exactly. In this case, the rear edges of the front fenders 5 bear exactly flush against the adjustment edge 10 of the assembly template 7. Due to the fact that both the side doors 4 and also the front fenders 5 are aligned exactly with respect to one another with a uniform joint spacing, it is possible to fit additional body parts, such as a bumper cover 6 illustrated in FIG. 1, precisely between the fenders 5.

A motor vehicle according to FIG. 2 essentially corresponds to the motor vehicle according to FIG. 1. In this motor vehicle too, a windscreen 2a is flanked on both sides by in each case one A-pillar 3a of the body support structure. In this motor vehicle too, an assembly template 7a in the form of a one-piece plastic component is mounted on the A-pillar 3a in front of a side door 4a. The assembly template 7a is also fastened in the region of the fastening points of the door hinges of the side door 4a with the aid of the fastening screws 8a and 9a belonging to the door hinges, to which end the assembly template is provided with corresponding bores 20, 21 in bulged areas 13a and 12a, respectively. The assembly template 7a, like the assembly template 7 according to FIG. 1, has an angular profile which is provided with an adjustment edge 10a reinforced by support ribs 19. In contrast to the motor vehicle according to FIG. 1, however, two body parts 14 and 16 can be mounted on the assembly template 7a, a lower body part 16 representing a front fender and an upper body part 14 representing a service flap.

Figure 3:
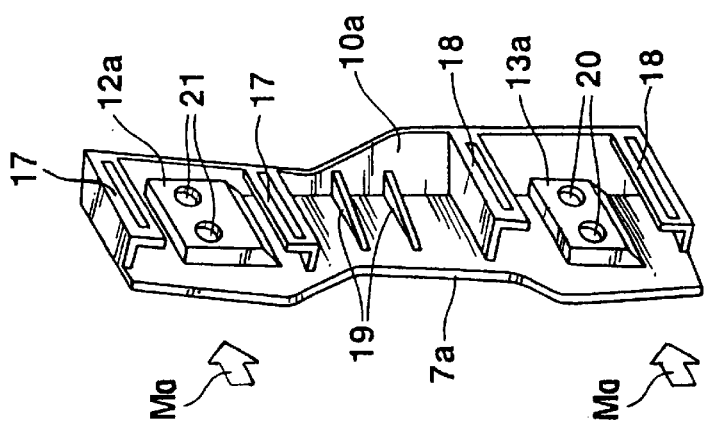
FIG. 3 shows a perspective illustration, enlarged with respect to FIG. 2, of the assembly template according to FIG. 2.

As can also be seen in FIG. 3, the assembly template 7a has an upper slide rail 17 and a lower slide rail 18, the two slide rails 17 and 18 being integrally molded on the plastic component of the assembly template 7a. The two slide rails 17, 18 in each case have two mutually corresponding guide profiles which are in each case aligned oppositely to one another. The slide rails 17 and 18 are aligned in the longitudinal direction of the vehicle and are open at the front in the direction of travel. At the rear, the slide rails 17 and 18 are delimited by the adjustment edge 10a. The upper slide rail 17 serves to receive a corresponding slide piece provided in the region of the rear edge of the service flap 14. The lower slide rail 18 serves to receive a further slide piece arranged in the region of the rear edge of the fender 16. Both the service flap 14 and the fender 16 can be slid onto the corresponding slide rails 17, 18 of the assembly template 7a in the direction of the arrows of the assembly direction Ma. In addition, hump-like longitudinal webs which are not illustrated in more detail and which protrude outwards are formed on the outsides of the slide profile of the two slide rails 17 and 18, which webs are assigned corresponding latching locations on the service flap 14 and on the fender 16, respectively, in the region of the respective slide piece. As a result, when they are slid onto the slide rails 17 and 18, the two body parts 14, 16 latch into their slid-on end position in which their rear edges bear against the adjustment edge 10a, in each case on the integrally formed webs, and are fixed in this slid-on end position. In this embodiment too, the body parts, in the form of the service flap 14 and of the front fender 16, adjoining the side door 4a are aligned exactly with respect to the side door 4a, so that the joint between the mutually adjacent body parts extends uniformly.

In other exemplary embodiments according to the invention, the assembly template is mounted on other parts of the body structure. In this case, other body parts, such as rear side doors and rear fenders or tailgates, are assigned to the assembly template. In the exemplary embodiment described, the assembly template was provided for body parts which can be attached approximately vertically. However, the assembly template is also suitable, in a similar way, for body parts to be attached approximately horizontally or obliquely, such as heads or bonnets and rear lids, by being mounted accordingly on suitable parts of the body support structure.

Figure 4:
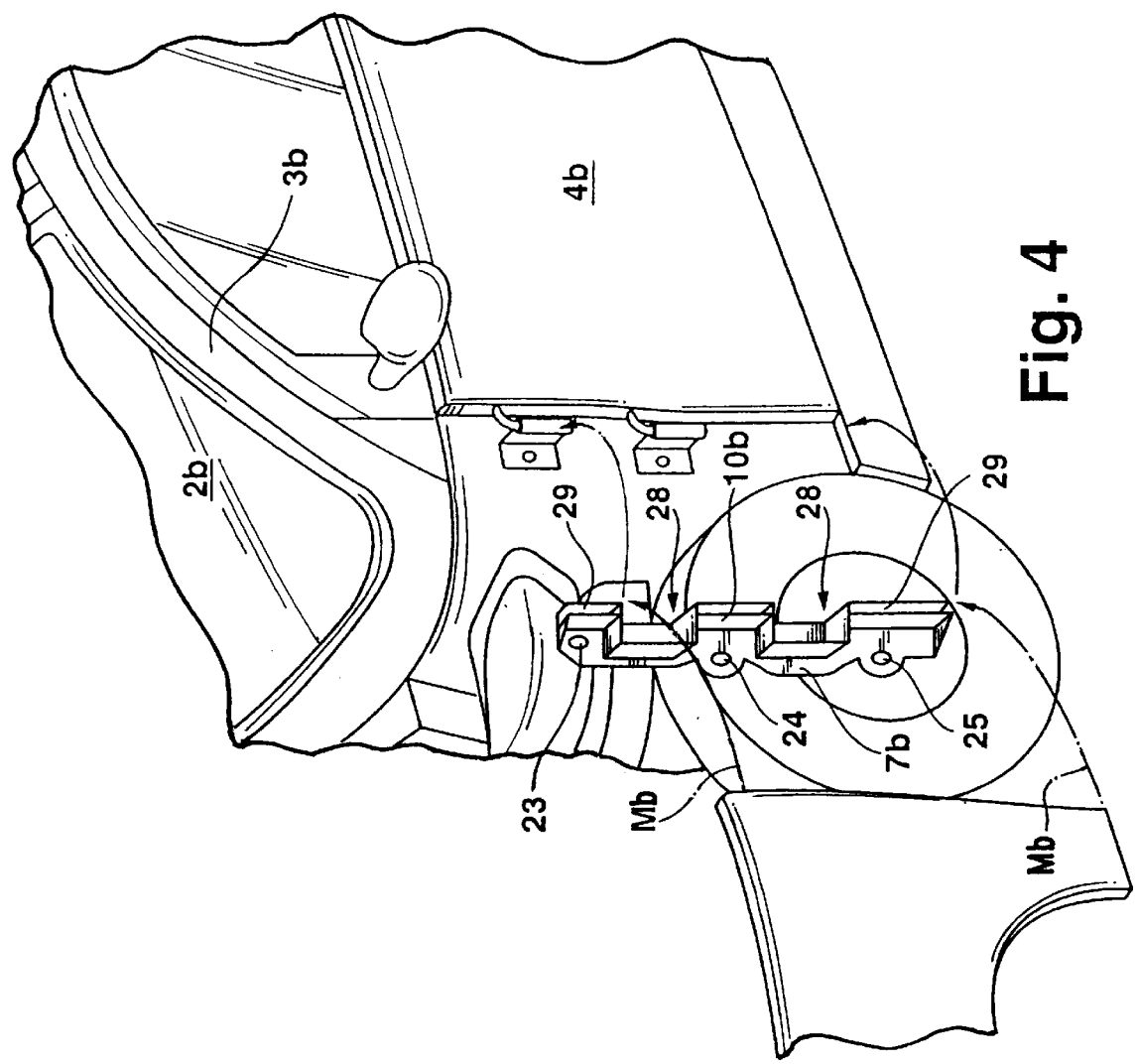
FIG. 4 shows a perspective illustration of a further embodiment of an assembly template similar to FIGS. 1 to 3, which can likewise be placed on door hinges of a side door in the region of an A-pillar of a motor vehicle.

In a motor vehicle in accordance with FIG. 4, the design of which essentially corresponds to the motor vehicle according to FIGS. 1 and 2, an assembly template 7b is provided, which like the assembly templates in accordance with FIGS. 1 to 3 has an adjustment edge 10b. This adjustment edge 10b extends over the entire length of the adjustment template 7b, but is interrupted by two angular receptacles 28 for the door hinges of the side door 4b. The design of the motor vehicle according to FIGS. 4 and 5 and the arrangement of the assembly template in the region of the A-pillar 3b and 3c, respectively, corresponds to the illustration of the two embodiments in accordance with FIGS. 1 to 3, which has already been described in detail, so that no detailed explanations of this will be given.

The assembly template 7b is also fastened on the body support structure with the aid of three assembly points 23, 24, 25 in the region of the door hinges. The assembly template 7b is in this case arranged in the region of the A-pillar 3b to the side of the windscreen 2b and - based on the direction of travel-in front of the side door 4b. A significant difference in the configuration according to FIG. 4 is that in the assembly template 7b a latching connection, latching slot 29 extending over the length of the assembly template 7b parallel to the adjustment edge 10b is provided, which latching slot is likewise interrupted by the two receptacles 28. A rear edge of the fender which adjoins at the front is latched into this latching slot 29, which fender to this end is provided with corresponding latching edges (not shown), which are angled off inwards at right angles.

For the purpose of simple assembly, the two front wings, together with the rest of the front region of the body, are initially combined to form a pre-assembled front structural unit which has a shell-like form. This front structural unit is now attached to the motor vehicle from the front, the fenders additionally being spread outwards by a certain amount in the region of their latching edges. The direction of assembly is illustrated by the arrows Mb. Spreading the front structural unit apart makes it possible to guide the latter on both sides of the motor vehicle as far as the level of the latching slots 29 of the assembly templates 7b and then to latch the fender ends in a simple manner into the respective latching slots 29. As a result, a simple and secure assembly of the front structural unit is achieved.

Figure 5:
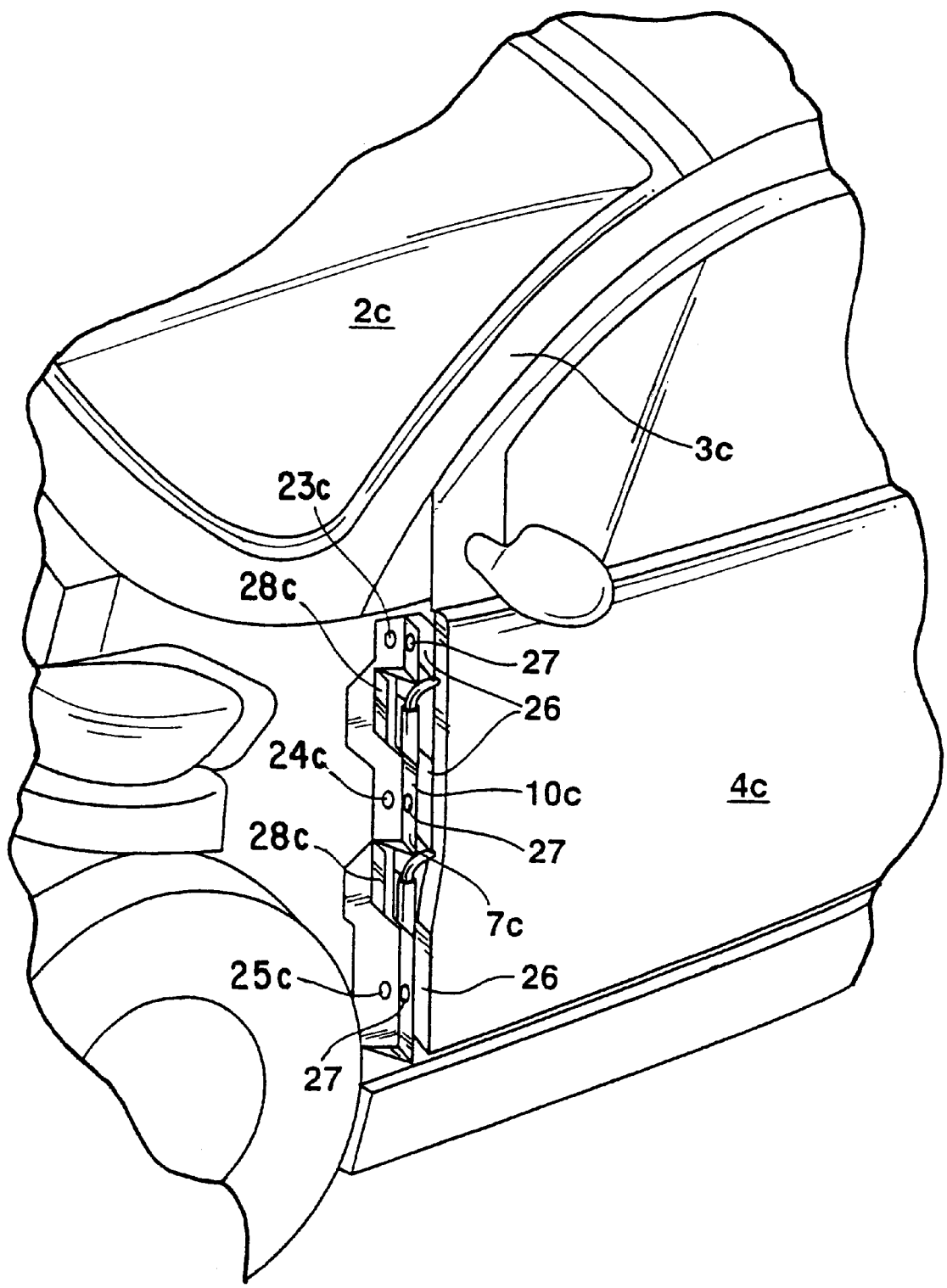
FIG. 5 shows a perspective illustration of a further embodiment of an assembly template which is attached to a motor vehicle according to the invention.

The assembly template 7c according to FIG. 5, which essentially corresponds to the embodiment in accordance with FIG. 4, is already fastened to the body support structure 2c, 3c, 4c of the motor vehicle with the aid of the assembly points 23c, 24c and 25c, this assembly template 7c also having a latching connection, latching slot 26 which is parallel to the adjustment edge 10c and is open outwards at the side. The length of this latching slot 26 too is interrupted by the door-hinge receptacles 28c. It can be seen from the illustration according to FIG. 5 that the assembly template, in the region of the latching slot 26, has three fixing points 27 which are distributed over its length and serve to fix the corresponding latching edges of the fender of the front structural unit. The latching edge of each fender of the front structural unit has three bores at the level of these three fixing points, which bores are aligned with the fixing points 27 in the latching position, inserted into the latching slot 26 of the fender and thus of the front structural unit.

Fixing elements are now attached from the door side through these fixing points 27 and through the corresponding bores in the front structural unit, screw/nut connections preferably serving as the fixing elements. These fixing points 27 are particularly advantageous for embodiments in which the latching slot 26 does not have any latching points, but is merely designed as a rectilinear insertion slot which does not ensure positively-locking securing of the fenders and thus of the front structural unit. Other fixing elements, in the form of latching pegs, rivet connections, or the like, can also be used according to preferred embodiments of the invention.

Figure 6:
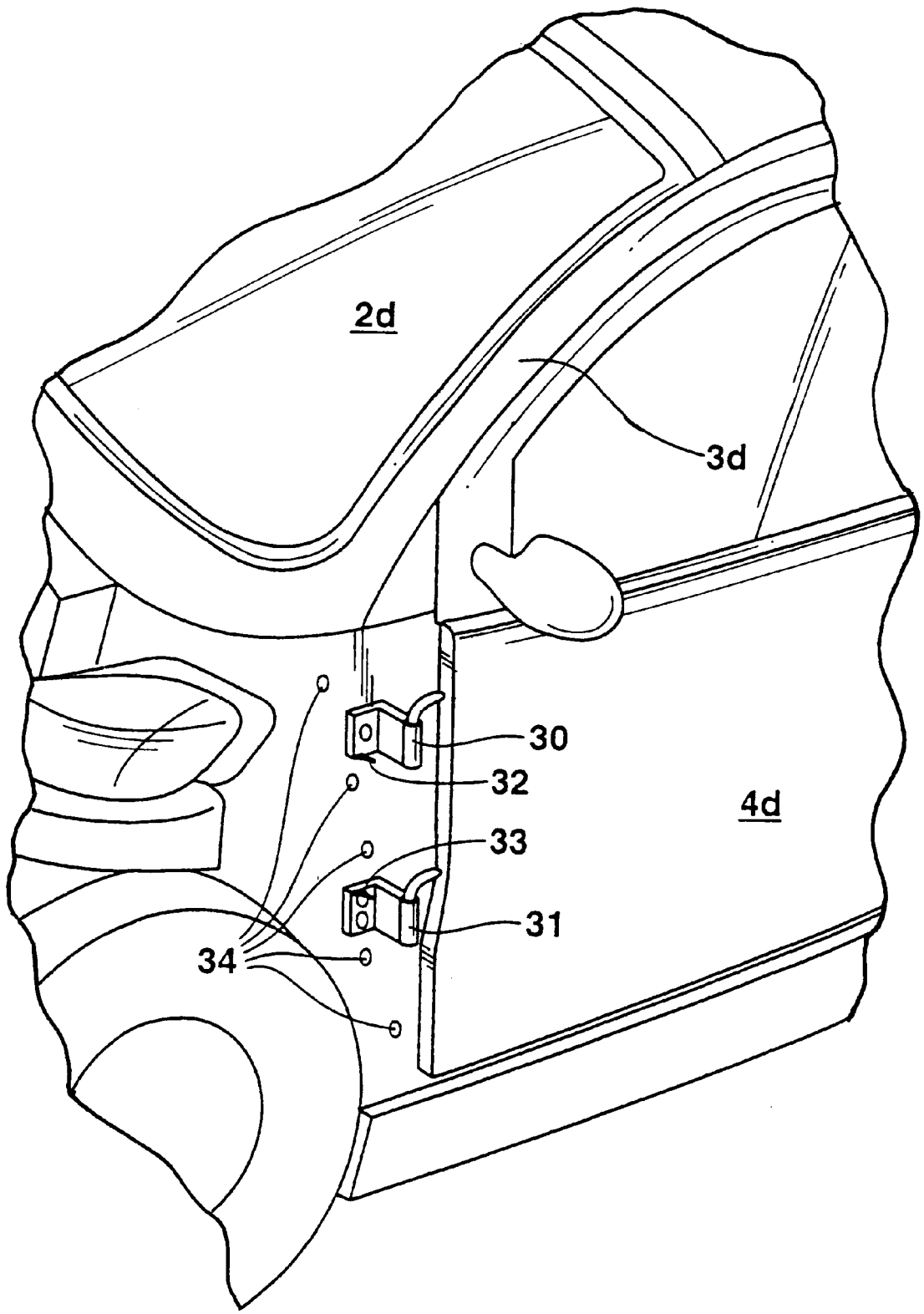
FIG. 6 shows a perspective view of a further embodiment of a motor vehicle according to the invention, at the level of door hinges of a side door, the door hinges being provided with centering pins for putting on an assembly template according to the invention.
Figure 7:
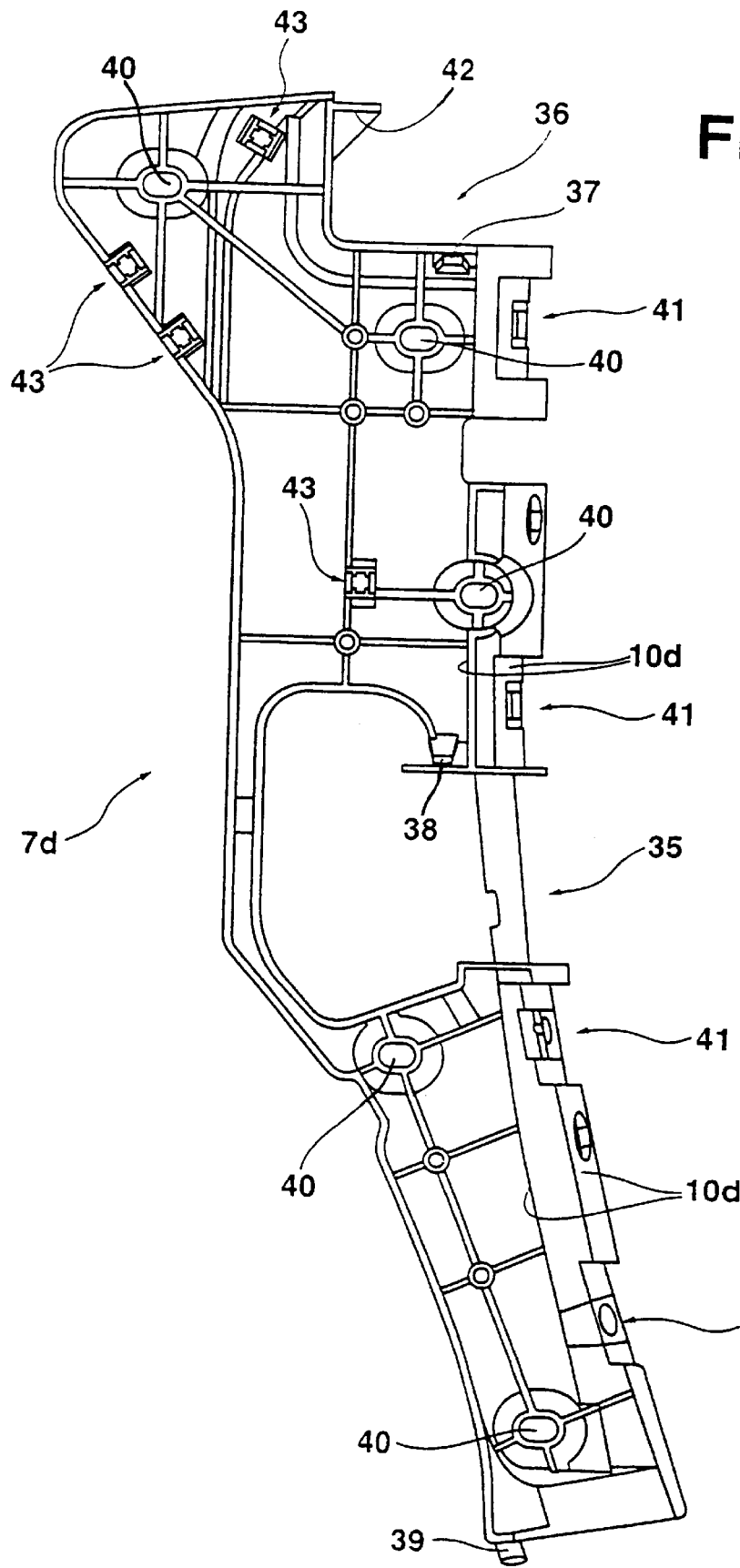
FIG. 7 shows an enlarged illustration of a further embodiment of an assembly template according to the invention.

A motor vehicle in the form of a motor car designed as a small car has, in accordance with FIG. 6, a side door 4d, which is attached to the self-supporting body support structure of the motor car approximately at the level of an A-pillar 3d, flanking a windscreen 2d, with the aid of two door hinges 30 and 31. The two door hinges 30, 31 are fastened to the body support structure at a distance one above the other and beneath a vehicle edge. An assembly template 7d (FIG. 7) is aligned with respect to these door hinges 30, 31 and fixed to the body support structure by means of fastening points 34. The assembly template 7d is fastened at the five fastening points 34 by means of screw connections. The two door hinges 30, 31 serve as a template for aligning the assembly template 7d. For the purpose of centering the assembly template 7d relative to the door hinges 30 and 31, the upper door hinge 30 has a positioning bolt or protrusion 32 protruding horizontally outwards and the lower door hinge 31 has a positioning bolt or protrusion 33 likewise protruding horizontally outwards. The positioning bolts 32, 33 are either fixed rigidly to the associated door hinges 30, 31 or else are formed integrally in one piece on the latter. The positioning bolts 32, 33 provide alignment of the assembly template 7d in the longitudinal direction of the vehicle. To this end, positioning receptacles 37, 38, serving as sockets, are provided in the assembly template 7d, both in the region of a cutout 36 for the upper door hinge 30 and in the region of a cutout 35 for the lower door hinge 31, which positioning receptacles are dimensioned in accordance with the measurements of the positioning bolts 32, 33. Moreover, elastically resilient clamping tabs are provided in the positioning receptacles 37 and 38, which clamping tabs reliably secure and clamp the assembly template 7d after it has been slid onto the positioning bolts 32 and 33. Apart from the differences which have been described, the basic design of the assembly template 7d corresponds to the assembly templates which have been described previously with reference to FIGS. 1 to 5. In particular, the assembly template has an adjustment edge 10d.

In order also to achieve exact alignment of the assembly template 7d in the vertical direction of the vehicle, a support stop 42 is formed on the assembly template 7d, in the region of the upper cutout 36, which support stop protrudes horizontally rearwards in the longitudinal direction of the vehicle and is supported on an upper edge of the door hinge 30. Instead of an upper edge, the upper door hinge may also have a different form of positioning support, which serves to support the support stop 42 and the dimensions and position of which are adapted to the support stop 42.

In order to be able to fix the assembly template 7d on the support structure side, the assembly template 7d has a corresponding number of fastening openings 40, which are arranged distributed over the surface of the assembly template 7d, at the level of the fastening points 34 on the body support structure.

Moreover, a plurality of cable-guiding clamps 43, which make it possible to guide and fix appropriate electrical cable sets, are formed on the assembly template 7d. A plurality of fastening eyelets 41, onto which fastening clamps can be slid, are provided on a rear side of the assembly template 7d. A rear edge of an adjoining body part, the configuration of which is similar to the body part 5 in accordance with FIG. 1, is screwed to these fastening eyelets 41. The assembly template 7d additionally has a projection 39 on its underside, to which projection the edge of a fender can be latched by means of an appropriate latching connection.

Figure 8:
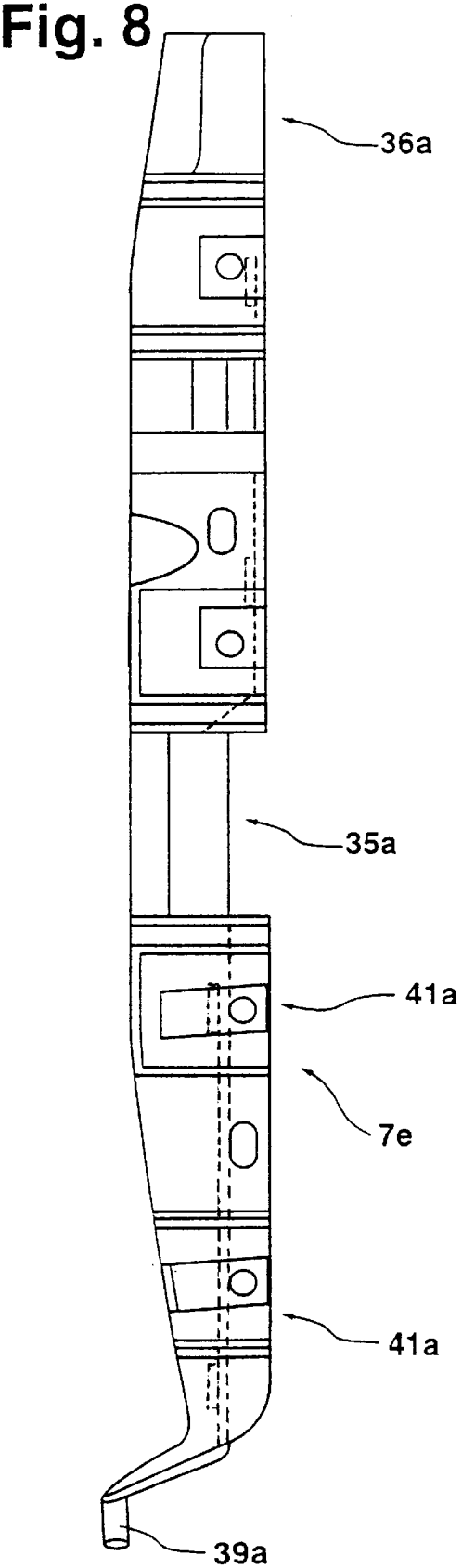
FIG. 8 shows a rear view of a final embodiment of an assembly template according to the invention.
Figure 10:
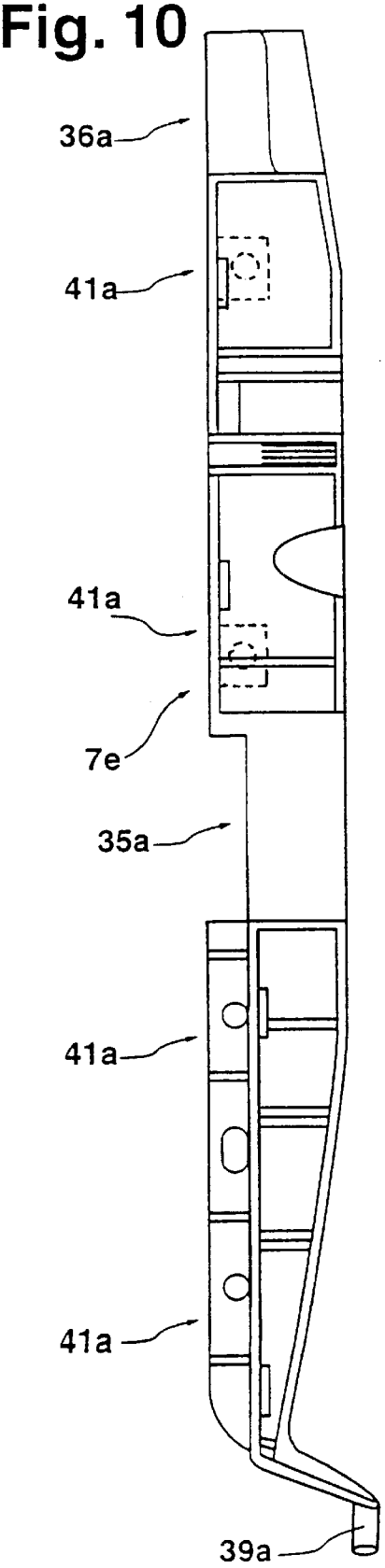
FIG. 10 shows a front view of the assembly template according to FIGS. 8 and 9.
Figure 9:
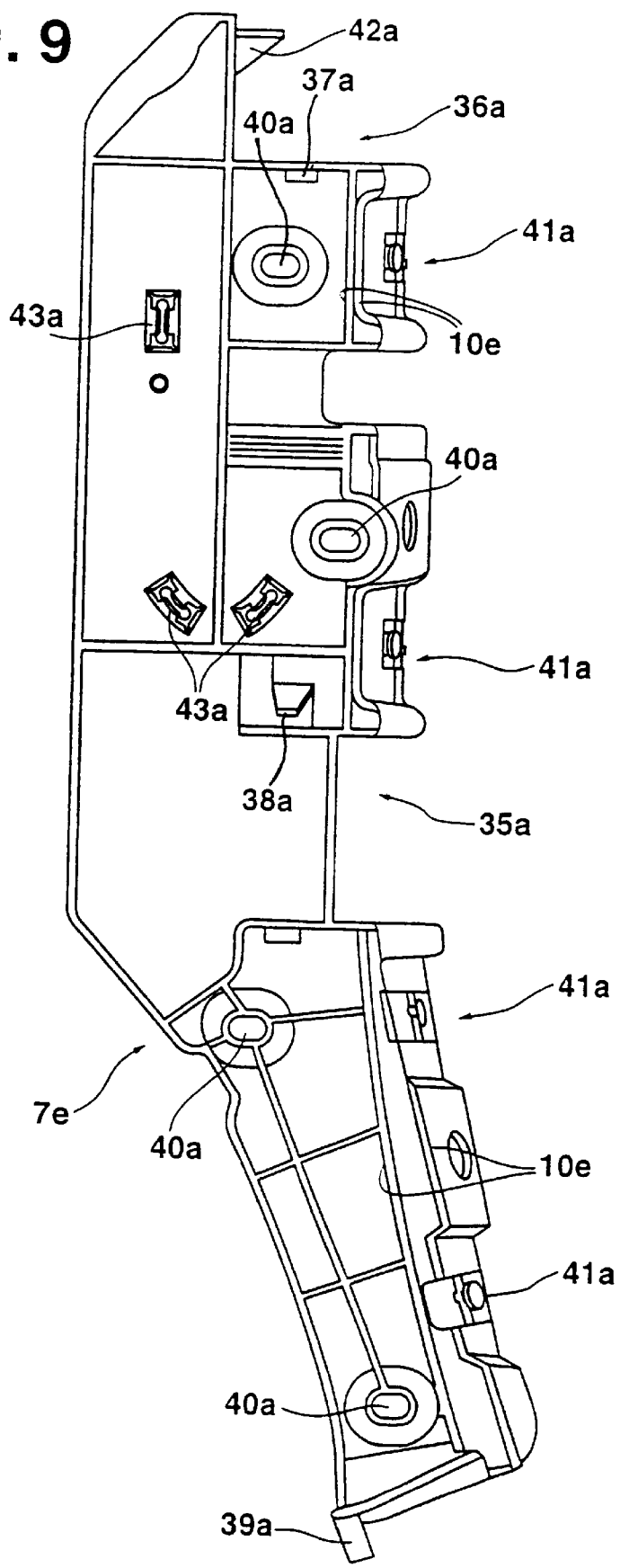
FIG. 9 shows a side view of the assembly template according to FIG. 8.

The assembly template 7e according to FIGS. 8 to 10 essentially corresponds to the assembly template 7d described above. Features 35a to 43a correspond respectively to features 35 to 43 of the embodiment of FIG. 7. This assembly template 7e is provided for another small car and has a slightly differently configured form. However, the basic function of the assembly template 7e and the alignment relative to the door hinges in this embodiment is not changed at all with respect to the exemplary embodiment according to FIG. 7. The assembly template 7e likewise has an adjustment edge 10e, the function of which corresponds to the adjustment edges described above. The functionally identical elements and sections of the assembly template 7e are therefore provided with the same reference numerals as those of the assembly template 7d, but with the addition of the letter "a". For further explanation of the assembly template 7e according to FIGS. 8 to 10, reference is therefore made to the description relating to FIG. 7.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Motor vehicle body structure comprising;
   body support structure,
   a separate assembly template attachable to the body support structure at a predetermined location, said assembly template having an adjustment edge,
   and a plurality of adjacent exterior body panel parts separate from the assembly template and connected to the body support structure with an edge of each one of the plurality of body panel parts aligned against the adjustment edge so as to be substantially flush with one another.

2. Motor vehicle body structure according to claim 1, wherein one of said plurality of body panel parts is a pivotal body part, wherein said assembly template is connectable to the body support structure with centering on a centering element of a vehicle hinge supporting the pivotal body part, and
   wherein said assembly template is separate from the hinge and is configured to assure alignment of said pivotal body part and another of said plurality of adjacent exterior body panel parts.

3. Motor vehicle body structure according to claim 2, wherein said pivotal body part is a vehicle door and said another of said plurality of adjacent exterior body panel parts is a vehicle fender.

4. Motor vehicle body assembly comprising:
   a body support structure,
   a first exterior body panel part supported by the body support structure,
   a second exterior body panel part supported by the body support structure, and
   an assembly template which is separate from the body support structure and the body panel parts and which is fixedly connectible to the body support structure at a predetermined location with respect to said first body panel part, said assembly template having an adjustment edge against which an edge of each of said first and second body panel parts is aligned to thereby precisely locate the first and second body panel parts to be adjacent to and substantially flush with one another when in an assembled condition.

5. Motor vehicle body assembly according to claim 4, wherein the first body panel part is a vehicle door panel pivotally supported at the body support structure by a plurality of vertically spaced hinges which are separate from the template.

6. Motor vehicle body assembly according to claim 5, wherein said template extends vertically to at least partially surround said plurality of hinges.

7. Motor vehicle body assembly according to claim 6, wherein said hinges include centering elements, and
   wherein the template further includes positioning receptacles engageable with the centering elements.

8. Motor vehicle body assembly according to claim 7, wherein said positioning receptacles are open sockets.

9. Motor vehicle body assembly according to claim 6, wherein said assembly template further includes receptacles which partially surround the hinges when in an assembled condition.

10. Motor vehicle body assembly according to claim 6, wherein the assembly template further has at least one latching location for joining the first and second body parts by a latching connection.

11. Motor vehicle body assembly according to claim 6, wherein the assembly template can be fastened at fastening points by fastening elements for the hinges on the body support structure.

12. Motor vehicle body assembly according to claim 6, wherein said door panel is a vehicle front side door panel, and
   wherein said second body panel part is a front vehicle fender.

13. Motor vehicle body assembly according to claim 6, wherein the assembly template is produced as a single component made of plastic.

14. Motor vehicle body assembly according to claim 5, wherein the assembly template is fastened to the body support structure at fastening points for the hinges.

15. Motor vehicle body assembly according to claim 5, further comprising common fastening elements to fasten the hinges and the assembly template to the body support structure.

16. Motor vehicle body assembly according to claim 5, wherein the assembly template is produced as a single component made of plastic.

17. Motor vehicle body assembly according to claim 5, wherein said door panel is a vehicle front side door panel, and wherein said second body panel part is a front vehicle fender.

18. Motor vehicle body assembly according to claim 4, wherein the first body part is supported on the body support structure by at least one hinge, said at least one hinge being engageable by a support stop of the template to position the template on the body support structure.

19. Motor vehicle body assembly according to claim 18, wherein said at least one hinge includes a support edge engageable with the support stop to vertically position the template with respect to the body support structure.

20. Motor vehicle body assembly according to claim 4, wherein the assembly template is fastened to the body support structure at a plurality of fastening points distributed over the template.

21. Motor vehicle body assembly according to claim 20, wherein the first body part is supported on the body support structure by at least one hinge, said at least one hinge being engageable by a support stop of the template to position the template on the body support structure.

22. Motor vehicle body assembly according to claim 4, wherein the assembly template further has at least one latching location for joining an adjacent said body part by a latching connection.

23. Motor vehicle body assembly according to claim 4, wherein the assembly template further has integrated cable guides.

24. Motor vehicle body assembly according to claim 4, wherein the assembly template further includes fixing elements for fixing the second body panel part on the assembly template and the body support structure.

25. Motor vehicle body assembly according to claim 24, wherein the fixing elements have guides for sliding on the second body panel part.

26. Motor vehicle body assembly according to claim 25, further comprising latching locations assigned to the fixing elements for securing the second body panel part in a positively locking manner when in a slid on position.

27. Motor vehicle body assembly according to claim 4, wherein the assembly template is produced as a single component made of plastic.

* * * * *